United States Patent
Aragones et al.

(10) Patent No.: US 6,871,105 B2
(45) Date of Patent: Mar. 22, 2005

(54) METHODS AND APPARATUS FOR REDUCING HYPERPLANES IN A CONTROL SPACE

(75) Inventors: James Kenneth Aragones, Clifton Park, NY (US); Carol Lynn Kiaer, Argyle, NY (US); Ronald George Maruscik, Lebanon, OH (US); Avinash Vinayak Taware, Niskayuna, NY (US); Robert Marcel Mattheyses, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 222 days.

(21) Appl. No.: 10/255,887

(22) Filed: Sep. 26, 2002

(65) Prior Publication Data

US 2004/0064201 A1 Apr. 1, 2004

(51) Int. Cl.[7] .............................................. G05B 13/02
(52) U.S. Cl. ............................ 700/28; 700/44; 700/45; 700/47; 701/96; 701/300; 701/301; 342/455; 244/3.1; 244/3.21; 244/3.25; 244/75 R; 244/76 R
(58) Field of Search .............................. 700/28, 41–45, 700/47; 701/96, 301, 300; 342/455; 318/561; 244/3.1, 3.21, 3.25, 75 R, 76 R

(56) References Cited

U.S. PATENT DOCUMENTS

| | | | |
|---|---|---|---|
| 3,576,298 A | * | 4/1971 | Barnett et al. .............. 244/162 |
| 3,964,443 A | | 6/1976 | Hartford |
| 4,619,234 A | | 10/1986 | Okamoto |
| 5,043,862 A | | 8/1991 | Takahashi et al. |
| 5,245,698 A | | 9/1993 | Matsunaga |
| 5,377,310 A | * | 12/1994 | Jain et al. ................... 700/260 |
| 5,455,890 A | | 10/1995 | Wang |
| 5,499,320 A | * | 3/1996 | Backes et al. .............. 700/260 |
| 5,657,988 A | * | 8/1997 | Kavounas .................... 273/242 |
| 5,737,214 A | | 4/1998 | Rahder et al. |
| 6,134,344 A | * | 10/2000 | Burges ....................... 382/155 |
| 6,327,530 B1 | * | 12/2001 | Nishimura et al. ........... 701/96 |

* cited by examiner

*Primary Examiner*—Ramesh Patel
(74) *Attorney, Agent, or Firm*—Fletcher Yoder

(57) ABSTRACT

A method for facilitating an optimization of a control space in n dimensions is provided. The control space includes a plurality of points, and the method includes removing at least one hyperplane of the control space, and perturbing the remaining points of the control space to lessen errors relative to the control space prior to the removal of at least one hyperplane.

24 Claims, 5 Drawing Sheets

AFTER PLANE REMOVAL
4 X 4 = 8 PLANES

METHODS AND APPARATUS FOR REDUCING HYPERPLANES IN A CONTROL SPACE

BACKGROUND OF THE INVENTION

This invention relates generally to aircraft engine power management schemes and more particularly, to removing at least one hyperplane from a control space of an engine management scheme.

An aircraft engine power management schedule specifies an engine power setting, which varies by flight condition and operational mode. The power management schedule is an important path deliverable in an aircraft certification process, which is developed from a quoted thrust rating, an average engine characteristics model, an engine control architecture, and an airplane flight range.

Desired power settings are calculated from an average engine in-flight thrust model using target thrust levels obtained from a quoted thermodynamic cycle model. Unfortunately, these calculations are typically too complicated for real-time engine control, so an interpolating controller (Full Authority Digital Engine Controllors "FADEC") is being used. The power management problem then becomes a problem in selecting the best subset of control space points to use in the controller. Current FADEC controllers use vectors of values in each dimension to specify points. For example, using the following values:

| | |
|---|---|
| Altitude, Feet = | {0, 1000, 10000, 25000, 30000, 40000} |
| Temperature, Degrees C. = | {−80, −40, −20, 0, 20, 40} |
| AirSpeed, MachNumber = | {0.1, 0.3, 0.5, 0.7, 0.9} |
| PowerLevel = | {takeoff, maxClimb} | provides for 3600 (6×6×5×2=3600) points on the control surface. A typical situation for a single power level often has over 5000 points on the control surface. Each power level is treated separately, resulting in a three-dimensional control space.

Optimization is achieved by reducing this target matrix which reduces the memory and throughput requirements of an engine controller. However, the table reduction is subject to constraints limiting overboost and underboost, while providing adequate operational margins on rotor speeds, exhaust gas temperature, etc.

Currently, this optimization is conducted manually using a visualization tool to find near-linear sectors across planes in the control space, deleting planes to reduce table size, and adjusting the levels of the remaining points to ensure that both the adjusted and interpolated values still achieve the overall requirements. However, there are drawbacks to the current manual optimization. One specific drawback is that it currently requires a substantial amount of labor to perform the manual optimization.

BRIEF DESCRIPTION OF THE INVENTION

In one aspect, a method for facilitating an optimization of a control space in n dimensions is provided. The control space includes at least one point, and the method includes removing at least one hyperplane of the control space, and perturbing any remaining points of the control space to lessen errors relative to the control space prior to said removal of at least one hyperplane.

In another aspect, a method for obtaining a control space containing a smaller number of hyperplanes than an original control space, subject to limits on the deviation of the optimized space from the original control space is provided. The method includes automatically removing at least one hyperplane from the control space.

In yet another aspect, a computer is configured to remove at least one hyperplane of a control space including at least one point, and perturb any remaining points of the control space to lessen errors relative to the control space prior to said removal of at least one hyperplane.

In still another aspect, a computer readable medium embedded with a program is provided. The program is configured to instruct a computer to automatically remove at least one hyperplane from an aircraft engine control space.

In still another further aspect, a method for facilitating a removal of a hyperplane from a control space in n dimensions, the control space including at least one point is provided. The method includes determining a removal cost for at least one point in the control space.

DETAILED DESCRIPTION OF THE INVENTION

As used herein, an element or step recited in the singular and preceded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features. The methods described herein allow for an automatic removal of hyperplanes using a heuristic approach and a perturbing of the remaining points of the control space to lessen the goal violations of the adjusted (for points remaining in the linear interpolation grid) or interpolated (for the removed points) values at each of the points of the original grid using a linear program, wherein both the heuristic plane removal program and the linear program are computer executed. Also, as used herein, the term computer is not limited to just those integrated circuits referred to in the art as computers, but broadly refers to computers, processors, microcontrollers, microcomputers, programmable logic controllers, application specific integrated circuits, Field Programmable Gate Arrays (FPGAs), and other programmable circuits. The herein described removal of hyperplanes and perturbation of the remaining points results in a control space that reduces the memory and throughput requirements of an engine controller.

Figure 1:
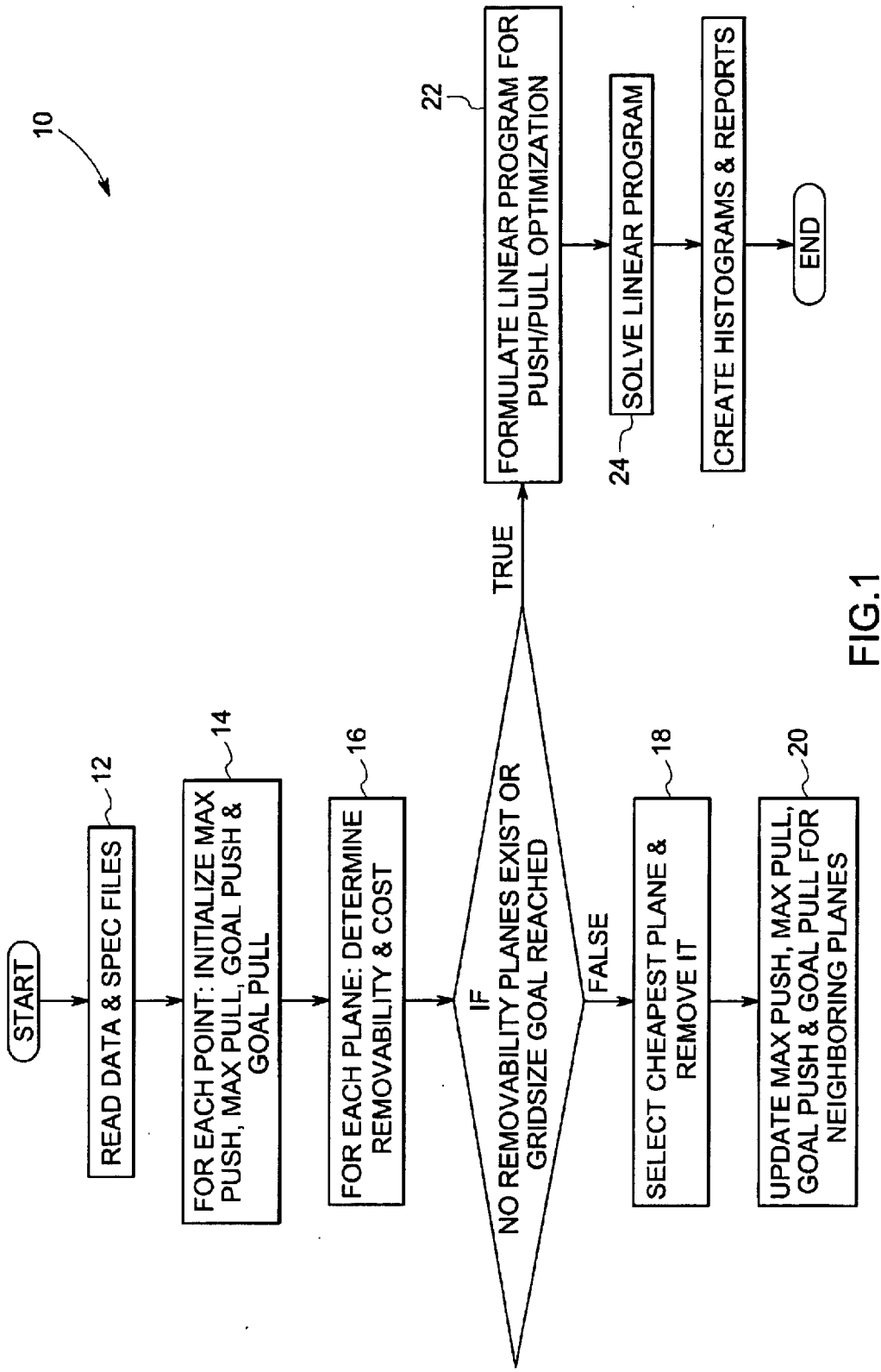
FIG. 1 is a flow chart of a method for reducing a number of hyperplanes in an n dimensional control space.

FIG. 1 is flowchart of a method 10 for reducing a number of hyperplanes in an n dimensional control space. As used herein, a hyperplane H refers to any subspace of any vector space V over any field K such that the space defined by V/H is a one dimensional subspace of V. Equivalently, given any vector space V over any field K and any nonzero linear map M from V to K, then the kernel of M forms a hyperplane H. It is contemplated that the benefits of the invention accrue to all n dimensional spaces including when n is equal to three, and therefore, as used herein, the term plane is used interchangeably with the term hyperplane. Method 10 includes reading 12 in data regarding the control space, and initializing 14 a plurality of constraints for each point of the control space. Method 10 also includes determining 16 if a plane is removable and removing 18 the plane if the plane was determined 16 to be removable. In other words, the problem of optimizing a control space is decomposed into two problems. The first problem is Plane Selection i.e., determining the best subset of hyperplanes to remove. The Plane Selection problem is solved by evaluating the removability of each non-boundary hyperplane, estimating the cost of each removal, and then heuristically selecting planes for removal. The second problem is to optimize the remaining points. The remaining points are adjusted using a linear programming to meet any given operational constraints.

When determining 16 if a plane is removable, a cost associated with each plane is also determined. Among all the removable planes, the cheapest plane is removed. More particularly, method 10 also includes selecting 18 a cheapest plane (least costly) and removing the cheapest plane. In one embodiment, the n cheapest removable planes are identified, and exactly one of them is removed. For example, in one embodiment, a number of cheapest planes, say five, are identified and then one of those five cheapest planes is removed. The one plane to be removed can be user selected or can be randomly selected. Additionally, the one plane to be removed is selected other than by user selection or randomly. It is contemplated that the benefits of the invention accrue to all embodiments which select one of the cheapest planes regardless of which particular manner is used to select a particular one of the identified n cheapest planes. After a plane is removed, the previously initialized constraints are updated 20. After the first plane is removed, then the updated constraints are re-updated 20 during subsequent iterations of selecting 18 and removing the cheapest plane. In an exemplary embodiment, the constraints include max push, max pull, goal push, and goal pull.

Additionally, in determining a cost for each plane, weights are applied to various factors, such as, for example, weighting by region of the control space, and weighting by performance parameters, such as, for example, thrust and exhaust gas temperature (EGT). In one embodiment, a user can enter a weight for a specific plane to ensure that that specific plane is not removed as the cheapest plane. Alternatively, the user can specify that a certain plane not be removed. Additionally, a user may specify other conditions such as the number of allowable planes of a certain type. For example, the original control space has 5000 points and 50 planes including six temperature planes, and the user selects a gridsize goal of 1500 points with a maximum of four temperature planes, then the two cheapest temperature planes are removed regardless if there are cheaper non-temperature planes.

As explained in greater detail below, given a complete, rectangular linear interpolation grid, and tolerance levels for each point in the grid, method 10 is used to determine a complete rectangular subgrid, together with adjustments for the points in the subgrid, so that at all the original gridpoints, and the adjusted/interpolated values lie within the tolerances.

The tolerance range provides an upper and lower bound on the adjustment of each point. Expressing the adjustment at point (i, j, k) as $push_{ijk}>=0$ if the adjustment is positive, and $pull_{ijk}>=0$ if the adjustment is negative, the constraints imposed by the tolerance range can be written as $$\min Val_{ijk} <= val_{ijk} + push_{ijk} - pull_{ijk} <= \max Val_{ijk}$$

This is indeed true for the points which are included in the linear interpolation subgrid, but for other points the restriction is not on $val_{ijk}+push_{ijk}-pull_{ijk}$, but on the interpolated value. Therefore, the range constraints can be expanded and the adjusted value at each point is calculated by $$(val_{ijk} + push_{ijk} - pull_{ijk})p_i q_j r_k +$$

$$\begin{pmatrix} \frac{dist((i-1,j,k),(i,j,k))}{dist((i-1,j,k),(i+1\cdot j\cdot k))}(val_{(i-1)jk} + push_{(i-1)jk} - pull_{(i-1)jk}) + \\ \left(\frac{dist((i,j,k),(i+1,j,k))}{dist((i-1,j,k),(i+1,j,k))}\right)(val_{(i+1)jk} + push_{(i+1)jk} - pull_{(i+1)jk}) \end{pmatrix}$$

$$p_{i-1}(1-p_i)p_{i+1}q_j r_k +$$

$$\begin{pmatrix} \frac{dist((i-2,j,k),(i,j,k))}{dist((i-2,j,k),(i+1\cdot j\cdot k))}(val_{(i-2)jk} + push_{(i-2)jk} - pull_{(i-2)jk}) + \\ \left(\frac{dist((i,j,k),(i+1,j,k))}{dist((i-2,j,k),(i+1,j,k))}\right)(val_{(i+1)jk} + push_{(i+1)jk} - pull_{(i+1)jk}) \end{pmatrix}$$

$$p_{i-2}(1-p_{i-1})(1-p_i)p_{i+1}q_j r_k + \ldots$$

Where $dist((i-1,j,k)(i,j,k))$ represents the distance from the i−1,j,k point to the i,j,k point. Although, the possibilities are finite, there are a combinatorially large number of terms in each constraint, and each constraint is a polynomial of combinatorially large degree. The term shown on the second line of the equation accounts for the simplest possible interpolation, in which exactly one of the hyperplanes passing through the point is missing, and both neighboring hyperplanes in that direction are included, while the third line handles the case in which the left-hand neighboring plane is also missing.

Although, there are a combinatorially large number of terms in each constraint, and each constraint is a polynomial of combinatorially large degree, the range constraints are simple, linear constraints involving non-negative, continuous variables if the set of hyperplanes is known. The problem is then formulated 22 as a linear program, which is solved 24 easily.

The objective function of the linear program is based on several considerations. One is the tolerance range, which is actually two or more nested ranges. An inner range describes, for each point, a range of values which are all equally acceptable. There is no cost associated with an interpolated value which falls within the inner range, called the goal range. Optional intermediate ranges identify successively less desirable constraints. Associated with values lying within the outer range but outside the inner range is a cost equal to the distance between the interpolated value and the goal range. These costs are weighted with two factors. First, there is a weight associated with each point, which reflects the relative importance of staying within the goal range at the point. Second, there are weights associated with interpolations that over-estimate or under-estimate the value at a point. An outer, or limiting range, establishes the maximum and minimum acceptable values for interpolation at each point. In an exemplary embodiment, associated with values lying within the outer range is a cost which is a monotonic increasing function of a distance between the interpolated value and the goal range. This cost can be weighted in a plurality of different ways. In an exemplary embodiment, there is a weight associated with each point which reflects a relative importance of staying within the goal range at the point, together with weights associated with a plurality of interpolations that over-estimate or under-estimate the value at a point.

A hyperplane selection scheme for removing hyperplanes and thus reducing the size of the linear interpolation grid is developed. It calculates a cost estimate for removal of each non-boundary hyperplane in the linear interpolation grid. The hyperplane costs use the same tolerance ranges and weights that are used in the linear program objective function, but the calculation is simplified. In an exemplary embodiment, each hyperplane is considered in isolation.

Figure 2:
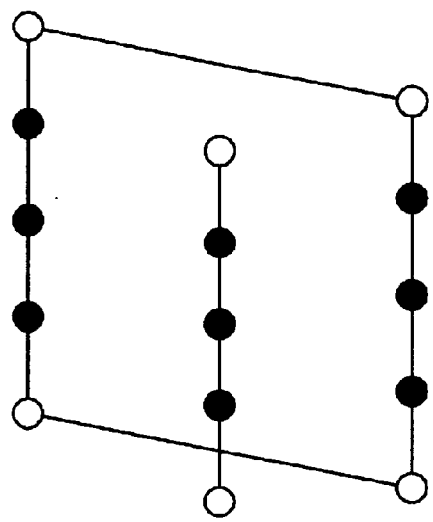
FIG. 2 illustrates a removable point in a control space.
Figure 3:
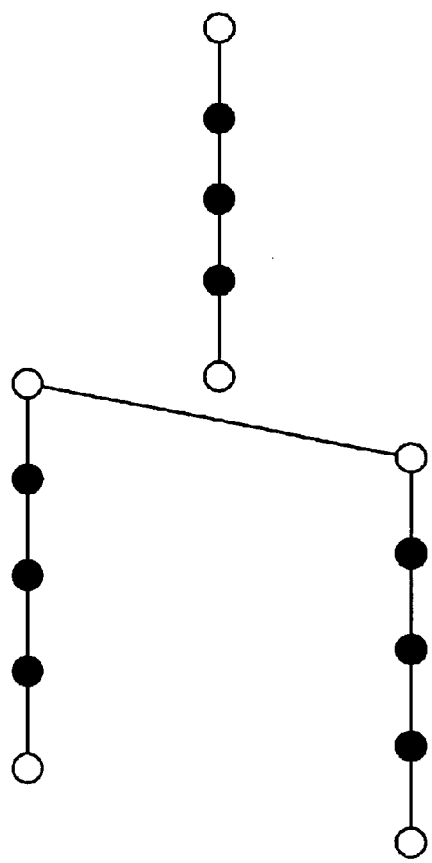
FIG. 3 illustrates a non-removable point in a control space.
Figure 4:
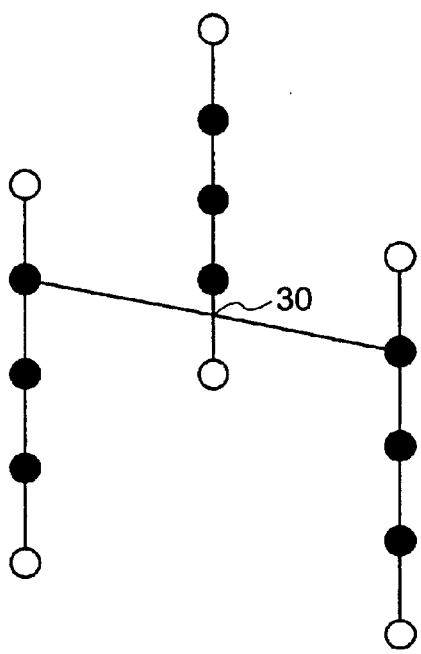
FIG. 4 illustrates a cost assessed based on a distance between a goal range of a candidate point and a goal interpolation range of the point's neighbors.

Before determining the cost of removing a hyperplane, the first task is to determine whether a given hyperplane is even removable. A hyperplane is removable if and only if all of the hyperplanes' points are removable. FIGS. 2 and 3 show removable and non-removable points, where, in each vertical set of points, the black point is the stated value at the point; the gray points indicate the upper and lower goals, and the white points indicate the upper and lower limits. In FIG. 2, the allowable area for the candidate point lies (at least in part) between the limiting interpolation lines of the neighboring points. In FIG. 3, no allowable values for the candidate point lie in the interpolation range of the neighbors. It is important to note that the removability of a point is directionally dependent. It is often the case that some but not all of the hyperplanes through a point can be removed. In order for a hyperplane to be removable, all that is required is that the points on the hyperplane be removable in that direction. Additionally, the hyperplane removal is done heuristically because the costing function used in the plane selection algorithm is approximate, i.e. the costing function considers each plane in isolation. In one embodiment, the hyperplane removal is done automatically, e.g., without an input from a user. In one embodiment, the hyperplane removal is not done automatically. Rather, the user is prompted to approve of the selected plane. Alternatively, the user is presented with a plurality of plane removal candidates, and the user selects which plane to remove. For removable hyperplanes, the removal cost is estimated using the following rule. If some portion of the goal region of the candidate point lies within the goal interpolation range of the neighbors, as in FIG. 2, then there is no cost. In the more general case, shown in FIG. 4, a cost is assessed based on a distance 30 between the goal range of the candidate point and the goal interpolation range of the neighbors.

In an exemplary embodiment, an initialization is performed wherein, for every point, the point's removability in all directions is determined. And for those directions in which the point is removable, calculate the removal cost for the point. After the initialization the following four steps are performed.

Step 1. For each remaining, removable hyperplane, weight and sum the point removal costs of all points remaining in the hyperplane, and divide the total by the number of points remaining in the hyperplane. This is the hyperplane removal cost.

Step 2. Select the hyperplane having the smallest hyperplane removal cost, and remove it.

Step 3. If the number of points remaining satisfies the requirements, STOP, formulate and solve the linear program. Otherwise, for the adjacent hyperplanes, recalculate the goals and limits for each point.

Step 4. For all points whose costs are based on the adjacent hyperplanes, recalculate the point removal costs, and return to Step 1.

Figure 5:
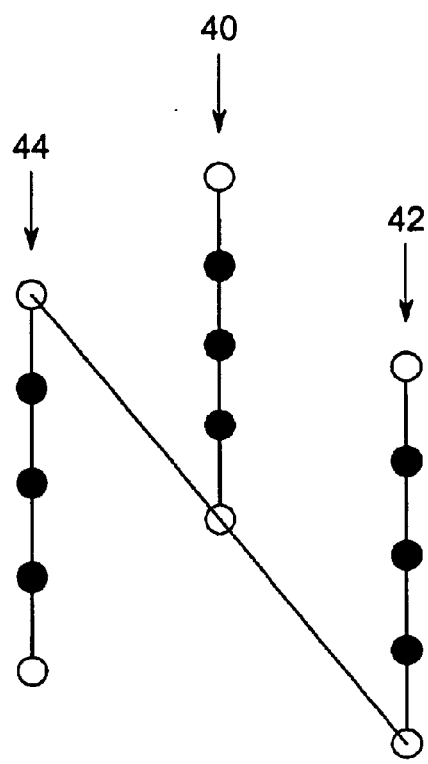
FIG. 5 illustrates a case in which removing a point leads to a new lower limit for a neighboring point.

FIG. 5 illustrates the case in which removing a point 40 leads to a new limits or goals for a neighbor point 42. More specifically, FIG. 5 illustrates the situation in which removing point 40 leads to a new lower limit for the right-hand neighbor point 42. These goal and limit recalculations facilitate ensuring that the ensuing removals result in a feasible linear program at the end, and also in assessing the costs of subsequent removals. Since the interpolated value for point 40 will now be based on the neighboring points, the limits on the neighboring points are verified to be sufficiently tight to ensure that the interpolated value will, in fact, lie in removed point's 40 allowable range. There are no values of a left-hand neighbor 44 which, when combined with the lowest limiting value for right-hand neighbor 42, would result in a legal interpolated value for the removed point 40. Thus the lower limit for right-hand neighbor 42 is raised.

In an exemplary embodiment, costs are figured according to the following scheme. If the allowable increase/decrease at a point (or its neighbors) makes it impossible to satisfy the hard constraints, let the cost be artificially large as it cannot be removed. Otherwise, let Thrust=($\partial$Thrust/$\partial$FanSpd)*(interpolatedFanSpd−FanSpd). Set % Thrust=Thrust/stated thrust. Also, if Thrust>0, then Cost=regionWt*pushCost*max (% Thrust−UprGoalLimit, 0), and if Thrust<0, then Cost=regionWt*pullCost*max (LwrGoalLimit−% Thrust, 0). Regions refer to portions of the flight envelope where airplanes typically have different operating parameters. For example, one region is where airplanes typically fly, and another region is where airplanes never fly. Other regions include a region where planes rarely fly, and a region where airplanes sometimes fly. Region weights (regionWt) are used to incorporate the possibility that an airplane will be in a given region. Of course, many other cost functions are possible, and the above costing scheme is provided by way of illustration only and not by limitation.

After determining the costs for each point then a Plane Cost Estimation is made by weighting the point costs by region and sum over the points in the plane. If there is a direction in which a maximum number of planes is stated, add a large value (10000) to the cost of planes in the other directions. One embodiment uses goal limits on Thrust and EGT (exhaust gas temperature). Of course extensions to other parameters are possible. Using goal limits involves, for each point, determining the maximum increase and decrease in fan speed that still permits all goals to be achieved, using hard limits on Thrust, EGT, N1 and N2, and for each point, determining the maximum increase and decrease in fan speed that respects the hard limits. This is accomplished using local derivatives for each dependent parameter with respect to fan speed. N1 refers to a low pressure system physical rotor (or shaft) speed, also typically called a physical fan speed. N2 refers to a high pressure system physical rotor (or shaft) speed, also typically called the physical core speed. If a hard limit is more restrictive than a goal limit, set the goal limit equal to the hard limit. As the plane removal algorithm progresses, the interpolation requirements may place additional restrictions on the allowable increase of decrease in fan speed of a point. After removal of all the hyperplanes to be removed, the remaining points of the control space are perturbed to lessen errors relative to the control space prior to the removal of the hyperplanes. For example, the linear program perturbs the values (fanspeeds) at the remaining points to lessen the cost of the variation between the original (before removal of a hyperplane) fanspeeds and the final (after removal of all hyperplanes to be removed) fanspeeds (adjusted or interpolated).

The objective of the linear program is to minimize the goal violations of the adjusted (for points remaining in the linear interpolation grid) or interpolated (for the removed points) values at each of the points of the original grid. Typically, constraints require that the adjusted or interpolated values be within the limits determined by the operating parameters, for example, thrust, EGT, core speed, etc. Of course, it is contemplated that the benefits of the invention accrue to methods that perturb the remaining points of the control space in ways other than the above described process.

In an exemplary embodiment, the perturbation process is as follows.

Given:

$MaxPush_{ijk}>=0$, $MaxPull_{ijk}>=0$ are the hard limits for all points, $MaxGoalPush_{ijk}>=0$, $MaxGoalPull_{ijk}>=0$ are the goal limits for all points, $w_{ijk}$=region weights for all points, and pushWt>0, pullWt>0 are the costs assigned to pushes and pulls (which may vary with (i,j,k,)).

Then let:

$goalPush_{ijk}>=0$, $goalPull_{ijk}>=0$ are the goal-violating pushes and pulls for all points, and $push_{ijk}>=0$, $pull_{ijk}>=0$ for all points (i, j, k).

InterpolatedFanSpd$_{ijk}$ is calculated using adjusted-FanSpeed (statedfanspeed+push−pull) of the remaining neighboring points.

In accordance with one embodiment, the process is to minimize:

$$\sum_i \sum_j \sum_k$$

$w_{ijk}*(\partial Thrust/\partial FanSpd_{ijk})*(pushWt*goalPush_{ijk}+pullWt*goalPull_{ijk})$ Subject to the following constraints:

For all points $push_{ijk}<=MaxPush_{ijk}$ and $pull_{ijk}<=MaxPull_{ijk}$

Figure 6:
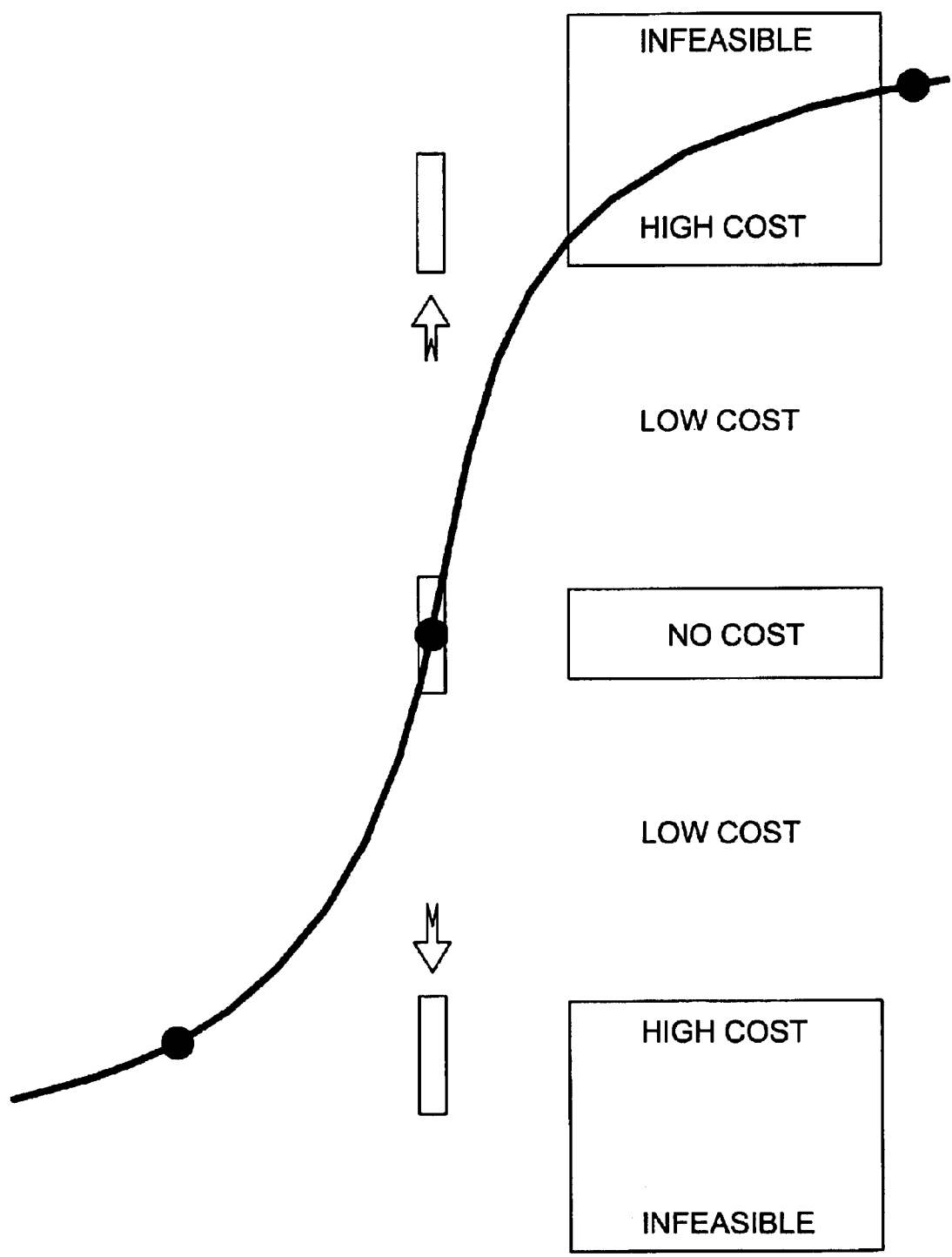
FIG. 6 graphically represents assigning a cost to a point.
Figure 7:
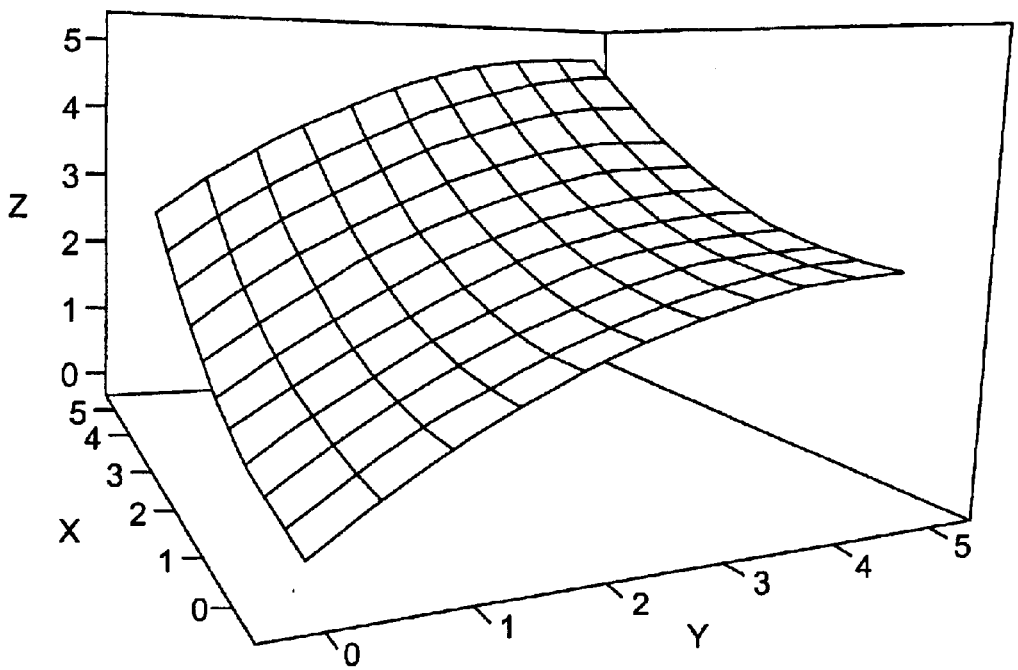
FIG. 7 illustrates an initial control surface having 22 planes.
Figure 8:
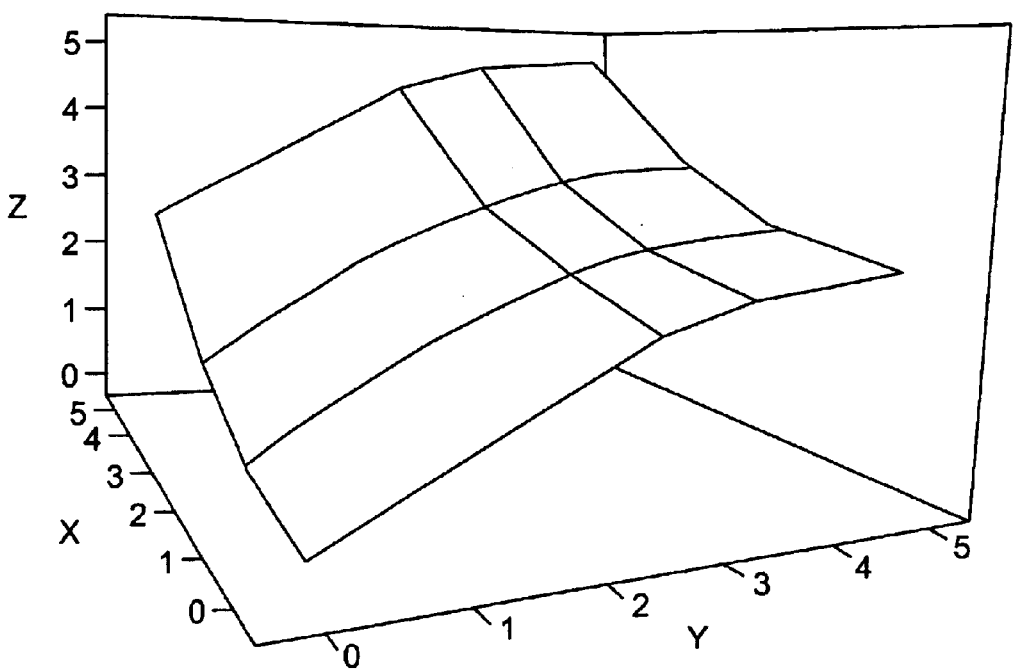
FIG. 8 illustrates a control surface having 8 planes.

For remaining points:

$goalPush_{ijk}<=MaxPush_{ijk}$ and $goalPull_{ijk}<=MaxPull_{ijk}$ $push_{ijk}-goalPush_{ijk}<=MaxGoalPush_{ijk}$ $pull_{ijk}-goalPull_{ijk}<=MaxGoalPull_{ijk}$ For removed points:

$InterpolatedFanSpd_{ijk}-goalPush_{ijk}<=FanSpd_{ijk}+MaxGoalPush_{ijk}$ $InterpolatedFanSpd_{ijk}-goalPull_{ijk}<=-FanSpd_{ijk}+MaxGoalPull_{ijk}$ FIG. 6 graphically represents assigning a cost to a point. FIG. 7 illustrates a two dimensional initial control surface having 22 planes, wherein the Z coordinate is a function of the X and Y coordinates. In other words the Z variable is dependent on the X and Y coordinates. The XY plane forms the control grid and because the control surface has an eleven point depth in the X direction and an eleven point depth in the Y direction, the grid includes 121 points (11*11). FIG. 8 illustrates a control surface having 8 planes, wherein the X and Y directions are 4 points deep and the associated grid includes 16 points (4*4). The cost function has inputs and outputs wherein the output is cost, and the inputs are user defined weights and difference between the control value goal and the current control value. In other words, the cost=f(weights, goal limits, control value), such that there is no cost in a desired range, an infinite cost beyond the acceptable range, and non-decreasing cost in between. So, the closer one is to the desired range, the lower one's cost is. In other words, the cost is initially zero in an interval around a point and then the cost increases as one moves away from the point.

While the invention has been described in terms of various specific embodiments, those skilled in the art will recognize that the invention can be practiced with modification within the spirit and scope of the claims.

What is claimed is:

1. A method for facilitating an optimization of a control space in n dimensions, the control space including at least one point, said method comprising:

automatically selecting at least one candidate hyperplane for removal from the control space;

removing at least one candidate hyperplane of the control space; and perturbing any remaining points of the control space to lessen errors relative to the control space prior to said removal of at least one hyperplane.

2. A method in accordance with claim 1 further comprising defining at least two nested ranges for constraints defined in the control space, wherein an innermost range describes highly desired constraints, any successive range describes less desired constraints, and an outermost range describes necessary constraints.

3. A method in accordance with claim 2 further comprising defining a plurality of sets of points in the control space according to an importance of having the control space inside the innermost range.

4. A method in accordance with claim 1 further comprising assigning a weight to a deviation at each point in the control space.

5. A method in accordance with claim 1 wherein said removing at least one hyperplane comprises heuristically removing at least one hyperplane from the control space.

6. A method for reducing a number of hyperplanes in a control space, subject to limits on deviation of the control space from an original control space, said method comprising:

automatically removing at least one hyperplane from the control space.

7. A method in accordance with claim 6 further comprising defining a goal range and a tolerance range, said automatically removing at least one hyperplane comprising automatically removing at least one hyperplane from the control space using both the goal range and the tolerance range.

8. A method in accordance with claim 7 wherein said automatically removing at least one hyperplane from the control space using both the goal and the tolerance range comprises heuristically removing at least one hyperplane from the control space using both the goal range and the tolerance range.

9. A method in accordance with claim 6 wherein said automatically removing at least one hyperplane comprises heuristically removing at least one hyperplane from the control space.

10. A method in accordance with claim 6 further comprising perturbing the remaining points of the control space to lessen deviation between adjacent points.

11. A method in accordance with claim 7 further comprising defining a plurality of sets of points in the control space according to an importance of having the control space inside the goal range.

12. A computer configured to:
   automatically select at least one candidate hyperplane for removal from a control space;
   remove at least one candidate hyperplane from the control space including a plurality of points; and
   perturb the remaining points of the control space to lessen errors relative to the control space prior to the removal of at least one hyperplane.

13. A computer in accordance with claim 12 further configured to receive definitions of at least two nested ranges for parameters defined in the control space, wherein an innermost range describes highly desired parameters, any successive range describes less desired parameters, and an outermost range describes necessary parameters.

14. A computer in accordance with claim 13 further configured to define a plurality of sets of points in the control space according to an importance of having the control space inside the innermost range.

15. A computer in accordance with claim 12 further configured to assign a weight to a deviation at each point in the control space.

16. A computer in accordance with claim 12 further configured to heuristically remove at least one hyperplane from the control space.

17. A computer readable medium embedded with a program configured to instruct a computer to:
   automatically remove at least one hyperplane from an aircraft engine control space.

18. A computer readable medium in accordance with claim 17 wherein said program is further configured to instruct a computer to:
   receive definitions for first tolerance range and a second tolerance range; and
   automatically remove at least one hyperplane from the control space using both the first range and the second range.

19. A computer readable medium in accordance with claim 17 wherein said program is further configured to instruct a computer to perturb the remaining points of the control space to lessen deviation between adjacent points.

20. A method for facilitating a removal of a hyperplane from a control space in n dimensions, the control space including at least one point, said method comprising determining a removal cost for at least one point in the control space.

21. A method in accordance with claim 20 further comprising generating a Plane Cost Estimation for at least one hyperplane of the control space using the determined cost for each point of the hyperplane.

22. A method in accordance with claim 21 wherein said generating a Plane Cost Estimation for each hyperplane further comprises generating a Plane Cost Estimation for each hyperplane by weighting the determined point costs by region and summing over the points in the hyperplane.

23. A method in accordance with claim 20 wherein said determining a cost for each point in the control space comprises determining a cost for each point in the control space in accordance with:

$Cost = regionWt * pushCost * \max(\% \text{Thrust} - UprGoalLimit, 0)$, if $\Delta Thrust > 0$; and $Cost = regionWt * pushCost * \max(LwrGoalLimit - \% Thrust, 0)$ if $\Delta Thrust < 0$;

wherein:
   $\Delta Thrust = (\partial Thrust / \partial FanSpd) * (interpolatedFanSpd - FanSpd)$; and
   $\% Thrust = \Delta Thrust / \text{stated thrust}$.

24. A method in accordance with claim 20 wherein said determining a cost for each point in the control space comprises determining a cost for each point in the control space using a monotonic increasing function of a distance between an interpolated value and a goal range.

* * * * *